United States Patent [19]

Schotter et al.

[11] Patent Number: 4,935,620

[45] Date of Patent: Jun. 19, 1990

[54] METHOD AND APPARATUS FOR FLIGHT PAYOUT TESTING OF OPTICAL FIBERS

[76] Inventors: Daniel K. Schotter, 6040 N. Camino Padre Isidro, Tucson, Ariz. 85718; Gary R. Redford, 5120 W. Greenock Dr., Tucson, Ariz. 85741

[21] Appl. No.: 359,199

[22] Filed: May 31, 1989

[51] Int. Cl.$^5$ .............................................. H01J 5/16
[52] U.S. Cl. .............................................. 230/227.11
[58] Field of Search ................... 250/227; 356/73.1; 367/4; 455/606

[56] References Cited

U.S. PATENT DOCUMENTS 4,777,660 10/1988 Gould .................................. 455/606
4,853,900 8/1989 Snyderwine .......................... 367/4

Primary Examiner—David C. Nelms
Assistant Examiner—Sherrie Hsia
Attorney, Agent, or Firm—R. A. Hays; M. W. Sales; W. Denson-Low

[57] ABSTRACT

A method and apparatus for payout testing of an optical fiber. The invention involves the attachment of a pod to a high speed aircraft with a parachute released during flight to initiate payout. The apparatus of the invention includes a bobbin mounted on a craft for retaining a coil of optical fiber and a parachute for using the air or fluid flow past the craft when the craft is in motion to pull the fiber from the coil. In a specific embodiment, the invention includes an electrooptical circuit for sending and receiving an optical signal along the fiber. Further, more specific, embodiments contemplate the use of load cells on the craft and parachute ends of the fiber to measure tension. This information is then transmitted to a receiver for analysis and/or storage. Other specific embodiments include a brake for inhibiting the payout of fiber during aborted test runs and a turns counter for providing a measure of the rate and amount of fiber payout.

17 Claims, 2 Drawing Sheets

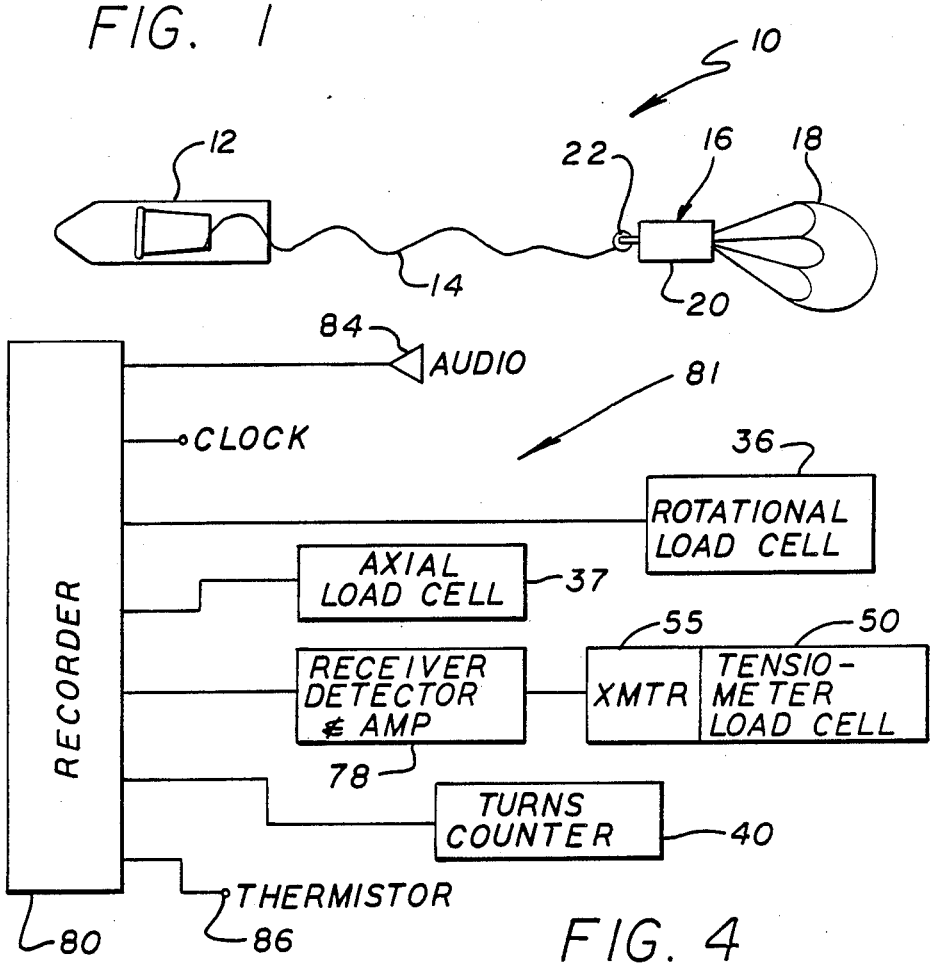
FIG. 1
FIG. 4
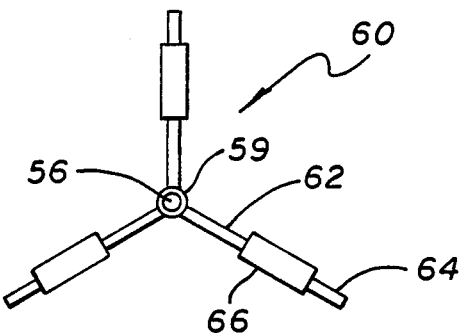
FIG. 3

METHOD AND APPARATUS FOR FLIGHT PAYOUT TESTING OF OPTICAL FIBERS

BACKGROUND OF THE INVENTION

1. Field of the Invention

The present invention relates to fiber optic communication systems. More specifically, the present invention relates to techniques for payout testing of optical fibers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Fiber optic guidance using a high speed payout of optical fiber offers the potential for low cost, precision guidance for both air and surface launched vehicles. This emerging technology offers considerable promise in terms of guidance accuracy, security and flexibility. Although a significant technical base has been established for high speed payout of optical fiber, there remains a need in the art for further developments in this area.

For example, the evaluation of the optical performance of the fiber during laboratory payout is very difficult. Significant modulation of the optical signal during payout has been experienced with virtually all of the currently known conventional laboratory techniques. As this modulation is not believed to be present during various actual flight test programs, this suggests that the laboratory payout techniques are not an accurate simulation of actual flight. Accordingly, alternative test procedures have been proposed and used to obtain certain critical engineering data regarding the optical performance of the fiber during payout. However, each of these tests has one or more significant shortcomings.

For example, one test involves the use of the fiber in an actual airborne vehicle. While this test provides a accurate data on actual in flight performance, the use and recovery of the airborne vehicle is prohibitively expensive. The airborne vehicle is difficult, if not impossible to instrument, i.e., with cameras and the like. Further, in situations where the vehicle on which the fiber will be used is not available, i.e., where the actual vehicle is under development, the test may not be as representative as possible with other test programs.

Thus, there is a need in the art for an inexpensive yet representative in-flight high speed optic fiber payout test apparatus and/or procedure.

SUMMARY OF THE INVENTION

The need in the art is addressed by the method and apparatus for payout testing of an optical fiber of the present invention. The invention involves the attachment of a pod to a high speed aircraft with a parachute released during flight to initiate payout. The apparatus of the invention includes a bobbin mounted on a craft for retaining a coil of optical fiber and a parachute for using the air or fluid flow past the craft when the craft is in motion to pull the fiber from the coil. In a specific embodiment, the invention includes an electro-optical circuit for sending and receiving an optical signal along the fiber. Further, more specific, embodiments contemplate the use of load cells on the craft and parachute ends of the fiber to measure tension. This information is then transmitted to a receiver for analysis and/or storage. Other specific embodiments include a brake for inhibiting the payout of fiber during aborted test runs and a turns counter for providing a measure of the rate and amount of fiber payout.

BRIEF DESCRIPTION OF THE DRAWINGS

FIG. 1 shows the advantageous apparatus for high speed payout of optical fiber of the present invention in a deployed state.

FIG. 3 is a rear view of the transmitter tube release mechanism utilized in the present invention.

FIG. 4 provides a simple illustrative test circuit for use in connection with the present invention.

DESCRIPTION OF THE INVENTION

Figure 2:
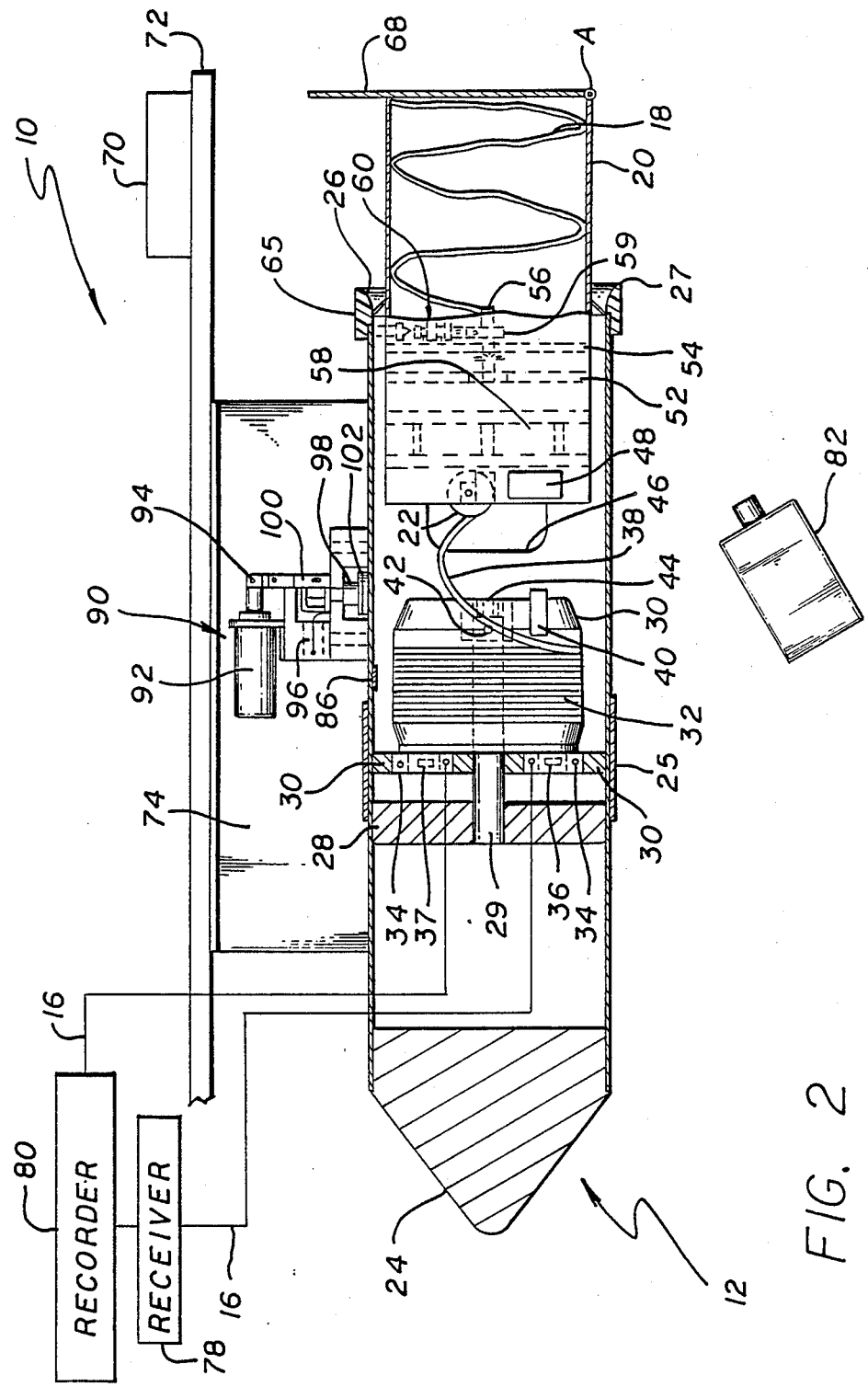
FIG. 2 provides a sectional side view of the apparatus of the present invention in an undeployed state.

Illustrative embodiments and exemplary applications will now be described with reference to the accompanying drawings to disclose the advantageous teachings of the present invention.

FIG. 1 shows the advantageous apparatus for high speed payout of optical fiber 10 of the present invention in a deployed state. The apparatus 10 includes a pod 12 to which the optical fiber under test 14 is attached at one end. The other end of the optical fiber 14 is attached to a parachute assembly 16. The parachute assembly 16 includes a parachute 18 which is attached to a canister or tube 20. A pulley 22 is mounted on an end of the tube 20. As discussed more fully below, the fiber 14 is wound about the pulley 22 and attached to a transmitter within the tube 20. The pod 12 is attached to an aircraft (not shown). The canister 20 with the parachute 18 is ejected from the end of the pod 12 when the aircraft is up to speed and altitude.

FIG. 2 provides a sectional side view of the apparatus 10 of the present invention in an undeployed atate. The pod 12 is simply a canister made of aluminum or other suitable material. The pod 12 is adapted to be carried on the exterior of an aircraft (not shown). Hence, the pod 12 has an aerodynamic nose cone 24 at one end. The pod 12 is open ended at the other end. The pod 12 has an exchangeable outer fairing 25. The fairing 25 is exchangeable to accommodate fiber optic canisters 32 within the pod 12 of various lengths. The fairing 25 has a lip 26 at the open end of the pod 12. The lip 26 has an annular smooth flaired teflon ring 27 within the periphery thereof. The teflon ring 27 is provided to minimize possible damage to the fiber 14 during payout caused by contact with the end of the fairing 25.

A bulkhead 28 is provided within the pod 12 in a plane normal to the longitudinal axis thereof. A support rod 29 extends from the center of the bulkhead 28. Two instrumented mounting rings 30 and a fiber optic canister assembly 32 are mounted on the support rod 29. The mounting rings 30, together with the support rod, and the bulkhead, serve as a letoff stand. The letoff stand is instrumented to measure axial (pulling) and torsion (twisting) forces on the fiber optic canister 32. The torsion force is exerted on the fiber optic canister 32 and is a measure of the tension of the fiber 14. Flexures 34 are mounted on flexures within the mounting ring 30 to facilitate these measurements. The flexures 34 are thin bending members of metal or other suitable material.

Load cells or strain gages 36 and 37 are mounted on the flexures 34 to measure the axial and torsion forces, respectively. Load cells are well known in the art and may currently be purchased from a company named Interface in Tempe, Ariz.

The fiber optic canister 32 consists of a bobbin on which the optical fiber 14 is wound. During payout, the fiber initially unwinds from the bobbin using a leader 38. The leader is a small section of Kevlar which provides a protective sheath for the fiber. The leader 38 is fabricated on the end of the fiber 14 and includes one or more steel wires for rigidity and/or a teflon tube through which the fiber 14 is passed. During payout, the turns of fiber 14 pass across a turns counter 40. The turns counter 40 includes a lamp 42 and an optical detector 44 (shown in phantom). The detector is mounted to receive optical energy reflected off the fiber 14 as the fiber 14 unwinds in a halical or corkscrew fashion during payout. Associated electronics (not shown) counts pulses output by the detector 44 to provide an indication of the amount and rate of fiber payout.

The fiber 14 is wrapped around the pulley 22 in the XMTR tube 20. The pulley 22 is attached to tube 20 through a conventional load cell 48 which measures fiber tension at the transmitter. The pulley 22 is partially visible through the access door 46 of the pod 12. A battery with a plurality of cells 58 and a printed circuit board 52 (both shown in phantom) are also included within the tube 20. The battery 50 is of conventional design and provides power for the transmitter and associated electronics 55 (not shown) on the circuit board 52. An end plate 54 serves as a bulk head for the tube 20. The pin 56 extends through the end plate 54 and is attached to a ring 59. The remaining end of the pin 56 is attached to a parachute 18. The ring 59 is part of a release mechanism 60. As shown in the rear view of FIG. 3, the release mechanism 60 provides for the retention of the tube 20 in the pod 12 until parachute deployment. As discussed more fully below, when the parachute 18 is deployed, the parachute 18 pulls on the pin 56 which, in turn, pulls on the ring 59. The ring pulls a linkage 62 which retracts pins 64 from notches 65 in the pod 12 (FIG. 2) through guide blocks 66.

As shown in FIG. 2, the parachute 18 is also located within the tube 20. The parachute 18 is a small spring loaded chute such as a drogue chute. As is known in the art, drogue chutes are small chutes that aid in the deployment in large chutes. The chute 18 is spring loaded to aid in deployment. The parachute 18 is retained within the tube 20 by a door 68. The door 68 is pivotally attached to the tube 20 at point A. The upper end of the door 68 is retained by a release mechanism 70. The release mechanism 70 may be a solenoid based release mechanism of conventional design. The release mechanism 70 is mounted on a mounting plate 72. The mounting plate 72 is adapted for ready attachment to a host aircraft (not shown). The plate 72 includes an extension 74 from which the pod 12 hangs.

Wires 16 run from the load cells 36 on the flexure ring 30 to an optional receiver 78 and/or recorder 80 located in the host aircraft. A camera 82 may be mounted in the undercarriage of the aircraft to film the deployment of the parachute 18 and the payout of fiber 14.

As shown in FIG. 2, a brake mechanism 90 is included on the pod 12 to retain the fiber 14 within the bobbin 32 during aborted tests. The brake mechanism 90 includes a solenoid 92. When activated, the solenoid 92 moves a linkage 94 which disengages a catch 96. The catch 96 releases a foot or pin 100 to move in response to a spring 98. The pin 100 moves through a mounting ring 102 into contact with the fiber 14 pinning it to the bobbin 32.

FIG. 4 provides a simple illustrative test circuit 81 for use in connection with the present invention. The circuit 81 is adapted to provide input to the recorder 80 from the load cells 36 and 37 directly and the load cell 50 via the transmitter 55 mounted in the parachute tube 20 and the receiver 78, the turns counter 40, a microphone 84, and a thermistor 86 mounted in the pod 12. The transmitter 55 and receiver 78 are of conventional design. In the preferred embodiment, the transmitter 55 provides a continuous wave signal which is modulated with a signal which represents the tension on the fiber 14 from the load cell 50.

Thus, the apparatus 10 allows for the practice of the method of the invention which includes the steps of (a) mounting a fiber 14 under test within a vehicle 12; (b) attaching a parachute 18 to the fiber 14; (c) moving the vehicle 12 in the test environment; and (d) deploying the parachute 18 such that the drag caused by the parachute in the air or fluid moving about to the vehicle 12 is effective to pull the fiber 14 from the bobbin 32.

Thus, the present invention has been described herein with reference to a particular embodiment for a particular application. Those having ordinary skill in the art and access to the present teachings will recognize additional modifications applications and embodiments within the scope thereof. For example, the invention is not limited to use with aircraft, the invention may be used with hydrodynamic vehicles without departing from the scope of the present invention.

It is therefore intended by the appended claims to cover any and all such applications, modifications and embodiments within the scope of the present invention.

Accordingly,

What is claimed is:

1. Apparatus for payout testing of an optical fiber comprising:
bobbin means mounted on a craft for retaining a coil of said optical fiber and
parachute means for using the air or fluid flow past said craft when said craft is in motion to pull said fiber from said coil.

2. The invention of claim 1 including electro-optical circuit means for sending and receiving an optical signal along said optical fiber.

3. The invention of claim 2 wherein said parachute means includes a parachute mounted within a tube.

4. The invention of claim 3 including a release mechanism for releasing said tube from said craft.

5. The invention of claim 2 including pulley means attached to said parachute means for connecting said fiber means to said parachute means.

6. The invention of claim 5 including load cell means attached to said pulley for measuring tension in the fiber at said parachute means.

7. The invention of claim 1 including load cell means for measuring the tension in said fiber at said craft.

8. The invention of claim 1 including brake means for inhibiting the payout from fiber from said bobbin means.

9. The invention of claim 8 wherein said brake means includes a solenoid activated spring loaded extension mounted on said craft for selective extension into said craft and for pinning said fiber to said bobbin means.

10. The invention of claim 1 including turns counter means for counting the turns of fiber payed out from said fiber.

11. The invention of claim 10 wherein said turns counter means includes a light source and an optical detector mounted within said craft for illuminating said fiber and for receiving light energy reflected therefrom respectively.

12. Apparatus for payout testing of an optical fiber comprising:
- bobbin means mounted on a craft for retaining a coil of said optical fiber;
- parachute means including a parachute attached to said fiber for using the air or fluid flow past said craft when said craft is in motion to pull said fiber from said coil;
- first load cell means for measuring the tension in said fiber at said craft;
- second load cell means for measuring the tension in said fiber at said parachute; and
- electro-optical circuit means functionally connected to said first and second load cell means for sending and receiving an optical signal along said optical fiber representative of the tension in said fiber as measured by said first and second load cell means.

13. The invention of claim 12 including brake means for inhibiting the payout from fiber from said bobbin means.

14. The invention of claim 12 wherein said brake means includes a solenoid activated spring loaded extension mounted on said craft for selective extension into said craft and for pinning said fiber to said bobbin means.

15. The invention of claim 12 including turns counter means for counting the turns of fiber payed out from said fiber.

16. The invention of claim 15 wherein said turns counter means includes a light source and an optical detector mounted within said craft for illuminating said fiber and for receiving light energy reflected therefrom respectively.

17. A method for high speed payout testing of an optical fiber including the steps of:
 (a) mounting the fiber within a vehicle;
 (b) attaching a parachute to the fiber;
 (c) moving the vehicle in the test environment; and
 (d) deploying the parachute such that the drag caused by the parachute in the air or fluid moving relative to the vehicle is effective to pull the fiber from the bobbin.

* * * * *